(12) United States Patent
Takano

(10) Patent No.: US 10,720,771 B2
(45) Date of Patent: Jul. 21, 2020

(54) CURRENT/VOLTAGE CONTROL APPARATUS

(71) Applicant: Mitsubishi Electric Corporation, Chiyoda-ku (JP)

(72) Inventor: Tomihiro Takano, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/097,649

(22) PCT Filed: Jan. 5, 2017

(86) PCT No.: PCT/JP2017/000127
§ 371 (c)(1),
(2) Date: Oct. 30, 2018

(87) PCT Pub. No.: WO2017/199462
PCT Pub. Date: Nov. 23, 2017

(65) Prior Publication Data
US 2019/0140445 A1 May 9, 2019

(30) Foreign Application Priority Data
May 18, 2016 (JP) .................................. 2016-099391

(51) Int. Cl.
*H02J 1/12* (2006.01)
*H02J 3/12* (2006.01)
(Continued)

(52) U.S. Cl.
CPC .................. *H02J 1/12* (2013.01); *H02J 1/00* (2013.01); *H02J 3/00* (2013.01); *H02J 3/12* (2013.01);
(Continued)

(58) Field of Classification Search
CPC ........ H02J 1/12; H02J 1/00; H02J 3/12; H02J 3/38; H02J 3/36; H02J 3/386; H02J 5/00; H02M 3/33507
(Continued)

(56) References Cited

U.S. PATENT DOCUMENTS 3,526,780 A 9/1970 Uhlmann et al.
9,489,701 B2 * 11/2016 Emadi .................... G06Q 50/06
2015/0333525 A1 11/2015 Choi et al.

FOREIGN PATENT DOCUMENTS

JP 43-8641 B1 4/1968
JP 2010-68625 A 3/2010
JP 2015-218730 A 7/2015

OTHER PUBLICATIONS

International Search Report dated Feb. 14, 2017 in PCT/JP2017/000127 Filed Jan. 5, 2017.
(Continued)

*Primary Examiner* — Michael R. Fin
(74) *Attorney, Agent, or Firm* — XSENSUS LLP

(57) ABSTRACT

A current/voltage control apparatus capable of following power changes in a DC system. A current/voltage control apparatus includes a central monitoring control device that controls V-I characteristics of a terminal converter based on power consumption consumed by a load facility and generated power generated by a power generation facility, and the central monitoring control device includes a load state setting unit that predicts a change range of the power consumption in a predetermined period and also predicts a change range of the generated power in the period and a V-I characteristic determination unit that determines the V-I characteristics of the terminal converter based on the change range of the power consumption and the change range of the generated power predicted by the load state setting unit.

9 Claims, 16 Drawing Sheets

(51) Int. Cl.
*H02J 5/00* (2016.01)
*H02J 13/00* (2006.01)
*H02J 3/38* (2006.01)
*H02J 1/00* (2006.01)
*H02J 3/00* (2006.01)
*H02J 3/28* (2006.01)
*H02J 3/36* (2006.01)
*H02M 3/335* (2006.01)

(52) U.S. Cl.
CPC .................. *H02J 3/28* (2013.01); *H02J 3/36* (2013.01); *H02J 3/38* (2013.01); *H02J 3/386* (2013.01); *H02J 5/00* (2013.01); *H02J 13/00* (2013.01); *H02M 3/33507* (2013.01); *Y02E 40/72* (2013.01); *Y04S 10/12* (2013.01)

(58) Field of Classification Search
USPC .......................................................... 307/82
See application file for complete search history.

(56) References Cited

OTHER PUBLICATIONS

Wang, W. et al., "Droop Control Modelling and Analysis of Multi-terminal VSC-HVDC for Offshore Wind Farms", AC and DC Power Transmission (ACDC 2012) 10$^{th}$ IET International Conference on IET, 2012, pp. 1-6.

* cited by examiner

FIG. 4

| MEASUREMENT DATE | DECEMBER 18, 2015 (FRIDAY) |
|---|---|
| | POWER GENERATION FACILITY ID |

| MEASUREMENT DATE | DECEMBER 17, 2015 (THURSDAY) |
|---|---|
| | POWER GENERATION FACILITY ID |

| MEASUREMENT DATE | DECEMBER 16, 2015 (WEDNESDAY) | |
|---|---|---|
| | POWER GENERATION FACILITY ID | |
| MEASUREMENT TIME | POWER GENERATION FACILITY A | ... | POWER GENERATION FACILITY N |
| ... | ... | | ... |
| 9:59 | 97kW | | 198kW |
| 10:00 | 100kW | | 200kW |
| 10:01 | 103kW | | 206kW |
| 10:02 | 107kW | | 213kW |
| 10:03 | 110kW | | 221kW |
| 10:04 | 108kW | | 219kW |
| 10:05 | 110kW | | 222kW |
| 10:06 | 112kW | | 223kW |
| ... | ... | | ... |

F I G. 6

| TIME ZONE | POWER GENERATION FACILITY ID | | ... | POWER GENERATION FACILITY N |
|---|---|---|---|---|
| | POWER GENERATION FACILITY A | | ... | |
| | INCREASE MAXIMUM VALUE | DECREASE MAXIMUM VALUE | | |
| 0:00~0:59 | 0.0kW | 0.0kW | ... | ... |
| 1:00~1:59 | 0.0kW | 0.0kW | ... | ... |
| ... | ... | ... | ... | ... |
| 10:00~10:59 | +21.5kW | -18.8kW | ... | ... |
| 11:00~11:59 | +17.6kW | -17.0kW | ... | ... |
| ... | ... | ... | ... | ... |
| 23:00~23:59 | 0.0kW | 0.0kW | ... | ... |

F I G. 1 3

| TIME ZONE | POWER GENERATION FACILITY ID | | | POWER GENERATION FACILITY N |
|---|---|---|---|---|
| | POWER GENERATION FACILITY A | | | |
| | INCREASE/DECREASE EXPECTED VALUE | INCREASE MAXIMUM VALUE | DECREASE MAXIMUM VALUE | |
| 0:00~0:59 | 0.0kW | 0.0kW | 0.0kW | ... |
| 1:00~1:59 | 0.0kW | 0.0kW | 0.0kW | ... |
| ... | ... | ... | ... | ... |
| 10:00~10:59 | +1.6kW | +21.5kW | −18.8kW | ... |
| 11:00~11:59 | +0.4kW | +17.6kW | −17.0kW | ... |
| ... | ... | ... | ... | ... |
| 23:00~23:59 | 0.0kW | 0.0kW | 0.0kW | ... |

CURRENT/VOLTAGE CONTROL APPARATUS

TECHNICAL FIELD

The present invention relates to a current/voltage control apparatus that controls an output current and an output voltage of a terminal converter interconnected to terminals of a DC system.

BACKGROUND ART

A DC system capable of efficiently transporting electric power with less power losses is attracting attention. The DC system is constructed of a DC cable, at least one terminal converter interconnected to a terminal of the DC cable, a load facility interconnected to an arbitrary location of the DC cable, a power generation facility and the like. Here, as the terminal converter, a DC/DC converter mutually interchanging electric power with a neighboring DC system of another voltage class or an AC/DC converter mutually interchanging electric power with a neighboring AC system.

Each terminal converter properly maintains the voltage in the DC system and also receives power from another neighboring system when the power value of the whole DC system obtained by subtracting the generated power value of the power generation facility from the power consumption value of the load facility is a positive value, that is, when there is a power shortage in the DC system or sends power to another neighboring system when the power value of the whole DC system is a negative value, that is, when there is a power surplus in the DC system to always maintain the balance of demand and supply in the DC system.

Conventionally, a control method of a terminal converter has been disclosed (see, for example, Patent Document 1). In Patent Document 1, one terminal converter among a plurality of terminal converters plays a role of maintaining the voltage in the DC system by performing constant voltage control, and the other terminal converters perform constant current control to avoid the concentration of the burden of power interchange on the terminal converter performing constant voltage control.

When there is a load facility or a power generation facility in the DC system, underpower and surplus power of the whole DC system increase and decrease so that each terminal converter needs to increase or decrease the interchange power according to the increase or decrease. Thus, a method to make coordination possible throughout the DC system even by autonomous control has been extensively studied by setting the V-I characteristic to each terminal converter, determining the output voltage value corresponding to its own output current when each terminal converter performs constant voltage control according to the V-I characteristic, and determining the output current according to its own connection point voltage when each terminal converter performs constant current control (see, for example, Non-Patent Document 1).

However, in the autonomous control method in which each terminal converter controls the DC system, each terminal converter is controlled only by its own information and thus, there is no guarantee that the voltage is maintained within the proper range at all points in the DC system. As a measure against such a problem, a centralized supervisory control method that collectively monitors and controls a DC system in a centralized manner is known (see, for example, Patent Document 2).

In Patent Document 2, a current transformer (CT) as a current sensor and a potential transformer (PT) as a voltage sensor are installed in the vicinity of a terminal converter, a load facility, and a power generation facility, and a terminal measuring device receiving the current value and the voltage value from each sensor calculates each power value and transmits the power value to a central monitoring control device. In the central monitoring control device, the output power value of the terminal converter, the power consumption value of the load facility, and the generated power value of the power generation facility in the DC system are collected, the highest voltage point and the lowest voltage point in the DC system are determined by the load-flow calculation in which the current value flowing at each point of the DC cable and the voltage drop and the voltage rise caused by a current flowing according to the Ohm's law (more specifically, width of voltage drop=current×line resistance) are determined, and the output voltage value and the output current value are determined so that both fall within the appropriate range of the voltage.

PRIOR ART DOCUMENTS

Patent Documents

Patent Document 1: Japanese Examined Patent Application Publication No. 43-8641 (1968)
Patent Document 2: Japanese Patent Application Laid-Open No. 2010-68625

Non-Patent Document

Non-Patent Document 1: W. Wang, M. Barnes, O. Marfanovic, "Droop Control Modelling and Analysis of Multi-terminal VSC-HVDC for Offshore Wind Farms", AC and DC Power Transmission (ACDC 2012) 10th IET International Conference on IET, 2012, p. 1-6.

SUMMARY

Problem to be Solved by the Invention

In Patent Document 2, the monitoring control by the central monitoring control device needs to follow the change in the power consumption of the load facility and the change in the generated power of the power generation facility in the DC system at high speed. Even if the central monitoring control device measures each of the current power consumption value of the load facility and the current generated power value of the power generation facility and determines the appropriate voltage value and current value for the terminal converter based on these values, if the power consumption value and the generated power value greatly change up to the next monitoring control period, there is a possibility that the voltage deviates from the proper range.

Even in the configuration of centralized monitoring control utilizing high-speed communication technology of optical communication, in a situation where many DC systems are popularized or in a situation where the DC system becomes large scale, for example, one central monitoring control device has many DC systems and terminal converters, load facilities, and power generation facilities in many DC systems to monitor to control. In this case, considering the processing capability of a computer system, it is difficult to achieve monitoring control in a cycle of seconds and monitoring control in a cycle of minutes is considered to be more realistic.

However, when the power generation facility is, for example, a photovoltaic power generation system or a wind power generation system, the generated power varies in a cycle of seconds due to the flow of clouds or the change of wind, posing a problem that the change of power value cannot be followed in the DC system only by the centralized monitoring control in a cycle of minutes.

The present invention has been made to solve such a problem and an object thereof is to provide a current/voltage control apparatus capable of following power changes in a DC system.

Means to Solve the Problem

To solve the above problem, a current/voltage control apparatus according to the present invention is a current/voltage control apparatus that controls an output current and an output voltage of a terminal converter in a DC system including at least one terminal converter interconnected to a terminal of a DC cable, at least one load facility interconnected to the DC cable, and at least one power generation facility interconnected to the DC cable and includes a central monitoring control device that controls V-I characteristics of the terminal converter based on power consumption consumed by the load facility and generated power generated by the power generation facility, wherein the central monitoring control device includes a load result DB that accumulates the power consumption by associating with the load facility, a power generation result DB that accumulates the generated power by associating with the power generation facility, a prediction unit that predicts a change range of the power consumption in a predetermined period based on the power consumption at this time and the power consumption accumulated in the load result DB and also predicts a change range of the generated power in the period based on the generated power at this time and the generated power accumulated in the power generation result DB, and a V-I characteristic determination unit that determines the V-I characteristics of the terminal converter based on the change range of the power consumption and the change range of the generated power predicted by the prediction unit.

Effects of the Invention

According to the present invention, the current/voltage control apparatus is a current/voltage control apparatus that controls an output current and an output voltage of a terminal converter in a DC system including at least one terminal converter interconnected to a terminal of a DC cable, at least one load facility interconnected to the DC cable, and at least one power generation facility interconnected to the DC cable and includes a central monitoring control device that controls V-I characteristics of the terminal converter based on power consumption consumed by the load facility and generated power generated by the power generation facility, wherein the central monitoring control device includes a load result DB that accumulates the power consumption by associating with the load facility, a power generation result DB that accumulates the generated power by associating with the power generation facility, a prediction unit that predicts a change range of the power consumption in a predetermined period based on the power consumption at this time and the power consumption accumulated in the load result DB and also predicts a change range of the generated power in the period based on the generated power at this time and the generated power accumulated in the power generation result DB, and a V-I characteristic determination unit that determines the V-I characteristics of the terminal converter based on the change range of the power consumption and the change range of the generated power predicted by the prediction unit and therefore, power changes in the DC system can be followed.

The objects, features, aspects, and advantages of the present invention will become more apparent from the following detailed description and the accompanying drawings.

BRIEF DESCRIPTION OF DRAWINGS

FIG. 4 is a diagram showing an example of a data structure of a power generation record DB according to the first embodiment of the present invention.

FIG. 6 is a diagram showing an example of a generated power increase maximum value and a generated power decrease maximum value according to the first embodiment of the present invention.

FIG. 13 is a diagram showing an example of an increase/decrease expected value, an increase maximum value, and a decrease maximum value of generated power according to the second embodiment of the present invention.

DESCRIPTION OF EMBODIMENTS

Embodiments of the present invention will be described below with reference to the drawings.

First Embodiment

<Configuration>

Figure 1:
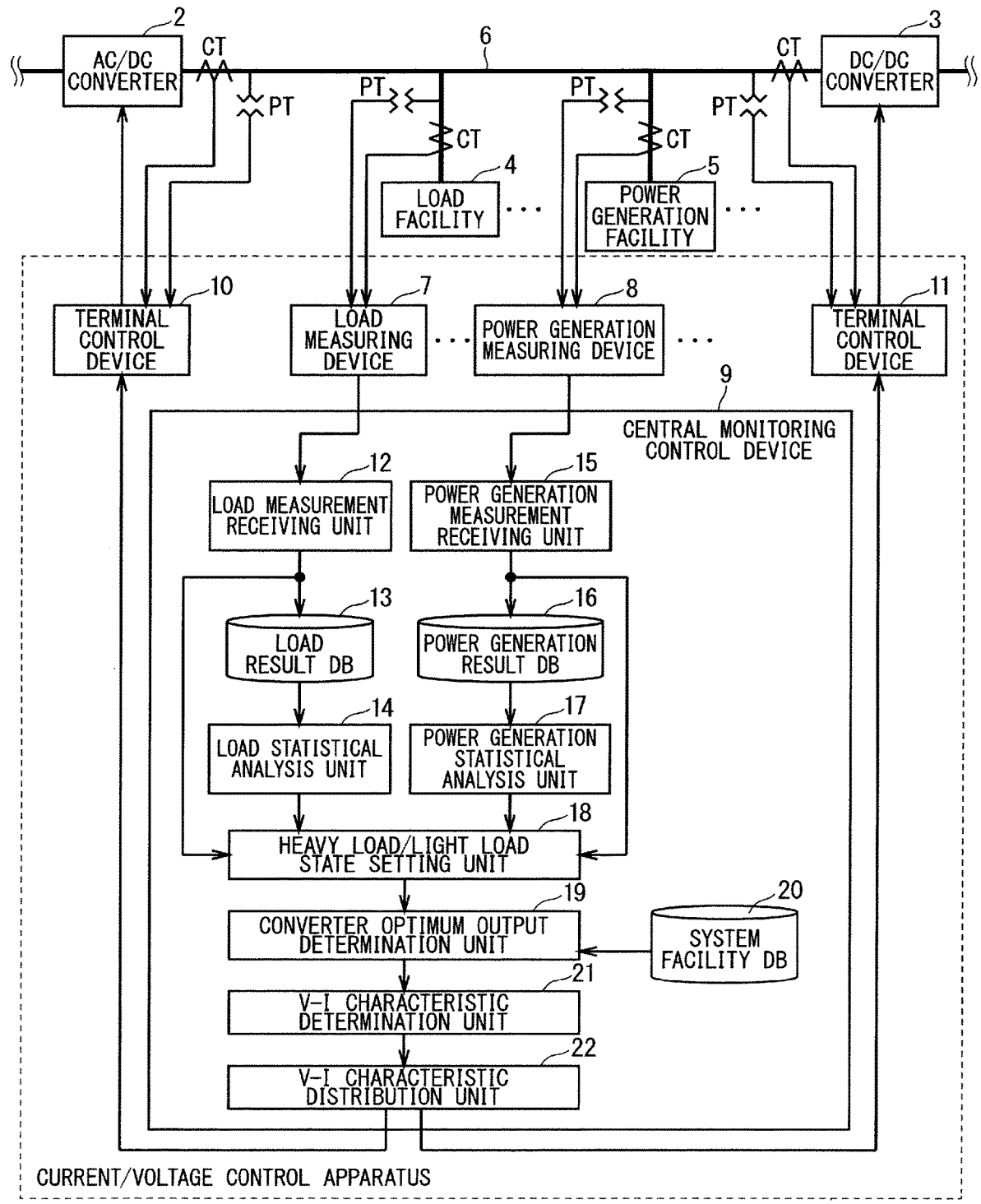
FIG. 1 is a block diagram showing an example of a configuration of a current/voltage control apparatus according to a first embodiment of the present invention.

FIG. 1 is a block diagram showing an example of the configuration of a current/voltage control apparatus and its periphery according to a first embodiment.

In a DC system to be monitored and controlled, an AC/DC converter 2 mutually interchanging power with another AC system and a DC/DC converter 3 mutually interchanging power with another DC system are interconnected to a DC cable 6. Though FIG. 1 shows a one-terminal DC system in which one AC/DC converter 2 and one DC/DC converter 3 are interconnected to the DC cable 6, the present embodiment is not limited to this example. For example, the DC system to be monitored and controlled may be a one-terminal DC system in which only one DC/DC converter 3 is interconnected to the DC cable 6 without the AC/DC converter 2 or a multi-terminal DC system in which a plurality of AC/DC converters 2 is interconnected to the DC cable 6, only a plurality of DC/DC converters 3 is interconnected to the DC cable 6, or at least one AC/DC converter 2 and at least one DC/DC converter 3 are interconnected to the DC cable 6. Hereinafter, the AC/DC converter 2 and the DC/DC converter 3 are collectively referred to as a terminal converter.

In the DC system, at least one load facility 4 that consumes DC and at least one power generation facility 5 that generates DC power are connected at interconnection points of the DC cable 6. It is assumed that the load facility 4 can freely consume electric power and the power generation facility 5 can freely generate electric power. As the power generation facility 5, various generators such as a generator that performs photovoltaic power generation or wind power generation, which is representative of renewable energy, a fuel cell, a fossil fuel combustion type generator such as a gas turbine can be cited. In the first embodiment, the power generation facility 5 called a distributed power supply that cannot be controlled by a current/voltage control apparatus 1 in a DC system is assumed.

In the current/voltage control apparatus 1, the output current and the output voltage of each terminal converter are controlled so that the sum of the power consumption or surplus power in the entire DC system that changes every moment by the load facility 4 and the power generation facility 5 and the power mutually interchanged with other power systems through the terminal converter is equal, that is, the balance between demand and supply in the DC system can be obtained.

The current/voltage control apparatus 1 includes a load measuring device 7, a power generation measuring device 8, a central monitoring control device 9, and terminal control devices 10, 11.

The load measuring device 7 calculates the power consumption value of each of the load facilities 4 by multiplying the instantaneous current waveform acquired from the CT installed at the interconnection point of the load facility 4 and the instantaneous voltage waveform acquired from the PT similarly installed at the interconnection point and transmits the calculated power consumption value to the central monitoring control device 9.

The power generation measuring device 8 calculates the generated power value of each of the power generation facilities 5 by multiplying the instantaneous current waveform acquired from the CT installed at the interconnection point of each power generation facility 5 and the instantaneous voltage waveform acquired from the PT installed at the interconnection point and transmits the calculated generated power value to the central monitoring control device 9.

The central monitoring control device 9 aggregates the power consumption value received from the load measuring device 7 via the communication network and the generated power value received from the power generation measuring device 8 via the communication network to determine the most desirable current/voltage distribution in the DC system and also determines the V-I characteristics as voltage-current characteristics of each terminal converter to implement the relevant current/voltage distribution before distributing the determined V-I characteristics to the terminal control devices 10, 11.

The terminal control devices 10, 11 determine the output voltage value or output current value of each terminal converter based on the V-I characteristics received from the central monitoring control device 9 and the current value and the voltage value calculated from the instantaneous current waveform and the instantaneous voltage waveform acquired from each of CT and PT installed at its own interconnection point and transmits the determined output voltage value or output current value to each terminal converter.

The configuration described above is a general configuration for performing centralized monitoring control. Hereinafter, the central monitoring control device 9, which is a feature of the present embodiment, will be described.

The central monitoring control device 9 includes a load measurement receiving unit 12, a load result Database (DB) 13, a load statistics analysis unit 14, a power generation measurement receiving unit 15, a power generation result DB 16, a power generation statistics analysis unit 17, a load state setting unit 18, a converter optimum output determination unit 19, a system facility DB 20, a V-I characteristic determination unit 21, and a V-I characteristic distribution unit 22.

Upon receiving the power consumption value from each of the load measuring devices 7, the load measurement receiving unit 12 gives a time stamp of the measurement time to the relevant power consumption value. The load result DB 13 accumulates power consumption values for a predetermined period (for example, one month or one year) for each of the load facilities 4.

The load statistics analysis unit 14 statistically analyzes the power consumption values for a predetermined period in the past accumulated in the load result DB 13 and calculates the increase maximum value and the decrease maximum value of the power consumption in a predetermined control period (for example, 10 minutes) for distributing the V-I characteristics from the central monitoring control device 9 to the terminal control devices 10, 11 for each of the load facilities 4. Details of the increase maximum value and the decrease maximum value will be described below.

Upon receiving the generated power value from each of the power generation measuring devices 8, the power generation measurement receiving unit 15 gives a time stamp of the measurement time to the generated power value. The power generation result DB 16 accumulates generated power values for a predetermined period (for example, one month or one year) for each of the power generation facilities 5. The period during which the power generation result DB 16 accumulates the generated power may not necessarily be the same as the period during which the load result DB 13 accumulates the power consumption value.

The power generation statistics analysis unit 17 statistically analyzes the generated power values for a predetermined period in the past accumulated in the power generation result DB 16 and calculates the increase maximum value and the decrease maximum value of the generated power in a predetermined control period for distributing the V-I characteristics from the central monitoring control device 9 to the terminal control devices 10, 11 for each of the power generation facilities 5.

The load state setting unit 18 calculates an assumed maximum value and an assumed minimum value of the power consumption of each of the load facilities 4 that can be assumed up to the next control period based on the current power consumption value of each of the load facilities 4 received by the load measurement receiving unit 12 and the increase maximum value and the decrease maximum value of the power consumption of each of the load facilities 4 calculated by the load statistics analysis unit 14. Similarly, the load state setting unit 18 calculates an assumed maximum value and an assumed minimum value of the generated power of each of the power generation facilities 5 that can be assumed up to the next control period based on the current generated power value of each of the power generation facilities 5 received by the power generation measurement receiving unit 15 and the increase maximum value and the decrease maximum value of the generated power of each of the power generation facilities 5 calculated by the power generation statistics analysis unit 17.

Further, the load state setting unit 18 sets as a heavy load state a combination of the power consumption value, which is the maximum power consumption value of each of the load facilities 4, and the generated power value, which is the minimum generated power value of each of the power generation facilities 5, which becomes the heaviest load as a DC system and sets as a light load state a combination of the power consumption value, which is the minimum power consumption value of each of the load facilities 4, and the generated power value, which is the maximum generated power value of each of the power generation facilities 5, which becomes the lightest load as a DC system The converter optimum output determination unit 19 determines the optimum output current value and output voltage value (or the optimum interconnection point voltage) of each terminal converter that satisfy two constraint conditions and whose evaluation calculated based on the predetermined evaluation index related to electric quantities such as the current, voltage, and power becomes the highest by calculation that makes a search from among all combinations of the output current value and the output voltage value (or the interconnection point voltage) that can be operated by each terminal converter by brute force or by an optimal computation means such as the linear programming method, quadratic programming method, or genetic algorithm to shorten the calculation time. Here, the two constraint conditions are conditions that each system voltage at interconnection points of the terminal converter, the load facility 4, and the power generation facility 5 in the DC system falls between the predetermined upper limit and lower limit of the voltage and each current passing through all points of the DC cable 6 is within a predetermined current allowable range for each of the heavy load state and the light load state set by the load state setting unit 18.

Here, it is assumed that the evaluation of the evaluation index is the highest in the case where the sum of conversion losses of the terminal converters and the line loss of the DC cable 6 is the minimum, that is, the power loss is the minimum. Alternatively, it is assumed that the evaluation of the evaluation index is the highest in the case where, for example, the deviation from the maximum voltage value to the upper limit of the voltage at a location where the voltage becomes highest in the DC system and the deviation from the lowest voltage value to the lower limit of the voltage at a location where the voltage becomes lowest in the DC system become equal, for example, throughout the heavy load state and the light load state so that the voltage distribution fits into an approximate middle region of the upper limit and the lower limit of the voltage so as to be in the most safe state against a sharp rise or a sharp fall of the voltage.

Figure 2:
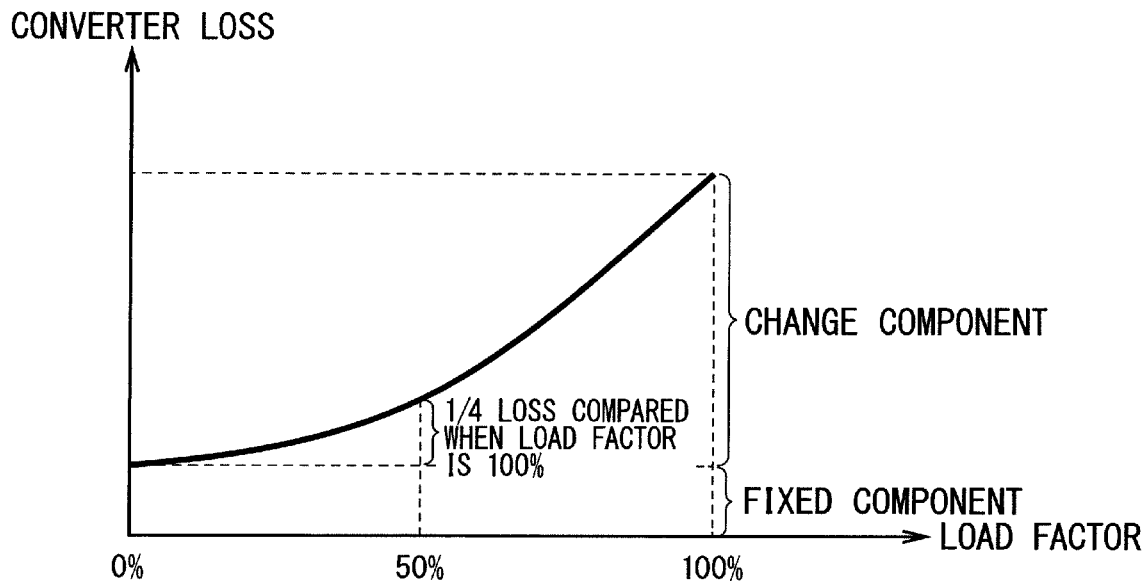
FIG. 2 is a diagram showing an example of general power loss characteristics of a terminal converter according to the first embodiment of the present invention.

For example, the concept of minimizing the power loss will be described. FIG. 2 is a diagram showing an example of general conversion loss of a terminal converter. The conversion loss is divided into a fixed component consumed by the control power supply of the terminal converter and a change component, which is the product of the square of an output current and an internal resistance of the terminal converter. In the case of the line loss of the DC cable 6, there is no fixed component and only the change component, which is the product of the square of a passing current and a line resistance, is obtained. That is, the conversion loss of the entire DC system is minimized by allocating the output current to each terminal converter so that all terminal converters have the same load factor if possible while avoiding the concentration of the output current on one terminal converter. Also, if the passing current at each point of the DC cable 6 is minimized, the line loss of the entire DC system is minimized. Further, when the power consumption and the generated power are the same, the current decreases with an increasing voltage, so that both the conversion loss and the line loss can be reduced. The converter optimum output determination unit 19 determines the output voltage and the output current of each terminal converter such that the loss caused by the current flowing in the DC system is minimized while the voltage is maintained within a proper range and an overcurrent is not caused.

The system facility DB 20 calculates the current/voltage distribution of the DC system from the power consumption value of the load facility 4 or the generated power value of the power generation facility 5 and also stores the line length and the line resistance value of the DC cable 6, interconnection points of the terminal converter, the load facility, and the power generation facility, conversion loss characteristics of the terminal converter and the like as original data to calculate the power loss in the DC system.

The V-I characteristic determination unit 21 sets a line connecting two points of the optimum output current value and the optimum output voltage value in the heavy load state and the light load state of each terminal converter as the V-I characteristics. The V-I characteristic distribution unit 22 distributes the V-I characteristics determined by the V-I characteristic determination unit 21 to the terminal control device that controls the relevant terminal converter via a communication network.

<Operation>

Figure 3:
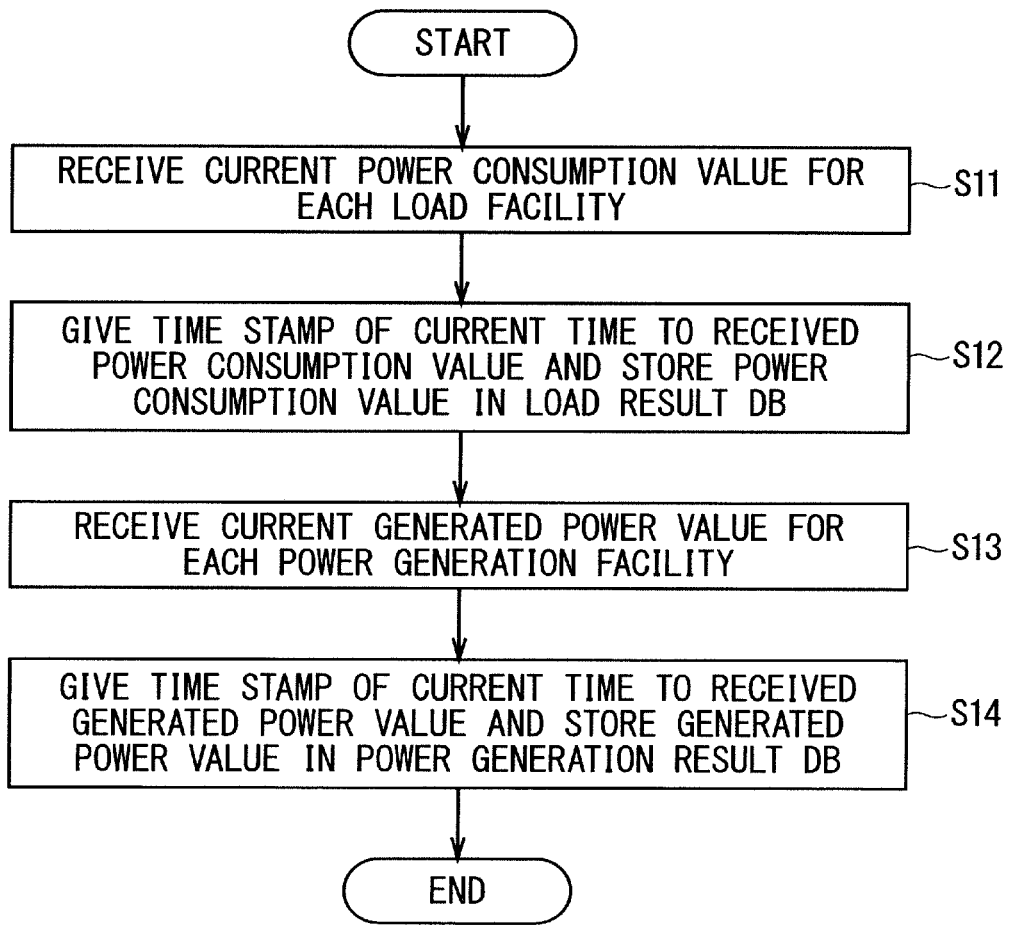
FIG. 3 is a flowchart showing an example of an operation of monitoring processing in a central monitoring control device according to the first embodiment of the present invention.

FIG. 3 is a flowchart showing an example of the operation of monitoring processing in the central monitoring control device 9. The operation of the monitoring processing shown in FIG. 3 is carried out in a fixed cycle matched to a predetermined communication cycle (for example, one minute cycle) with the load facility 4 and the power generation facility 5.

In step S11, the load measurement receiving unit 12 receives the current power consumption value of the load facility 4 measured by each of the load measuring devices 7.

In step S12, the load measurement receiving unit 12 gives a time stamp of the current time to all received power consumption values, and stores all the power consumption values in the load result DB 13 by associating with each of the load facilities 4.

In step S13, the power generation measurement receiving unit 15 receives the current generated power value of the power generation facility 5 measured by each of the power generation measuring devices 8.

In step S14, the power generation measurement receiving unit 15 gives a time stamp of the current time to all received generated power values, and stores all the generated power values in the power generation result DB 16 by associating with each of the power generation facilities 5.

FIG. 4 is a diagram showing an example of the data structure of the power generation result DB 16.

As shown in FIG. 4, the generated power value received by the power generation measurement receiving unit 15 is accumulated in such a way that the power generation facility 5 and the date and time can be identified.

Figure 5:
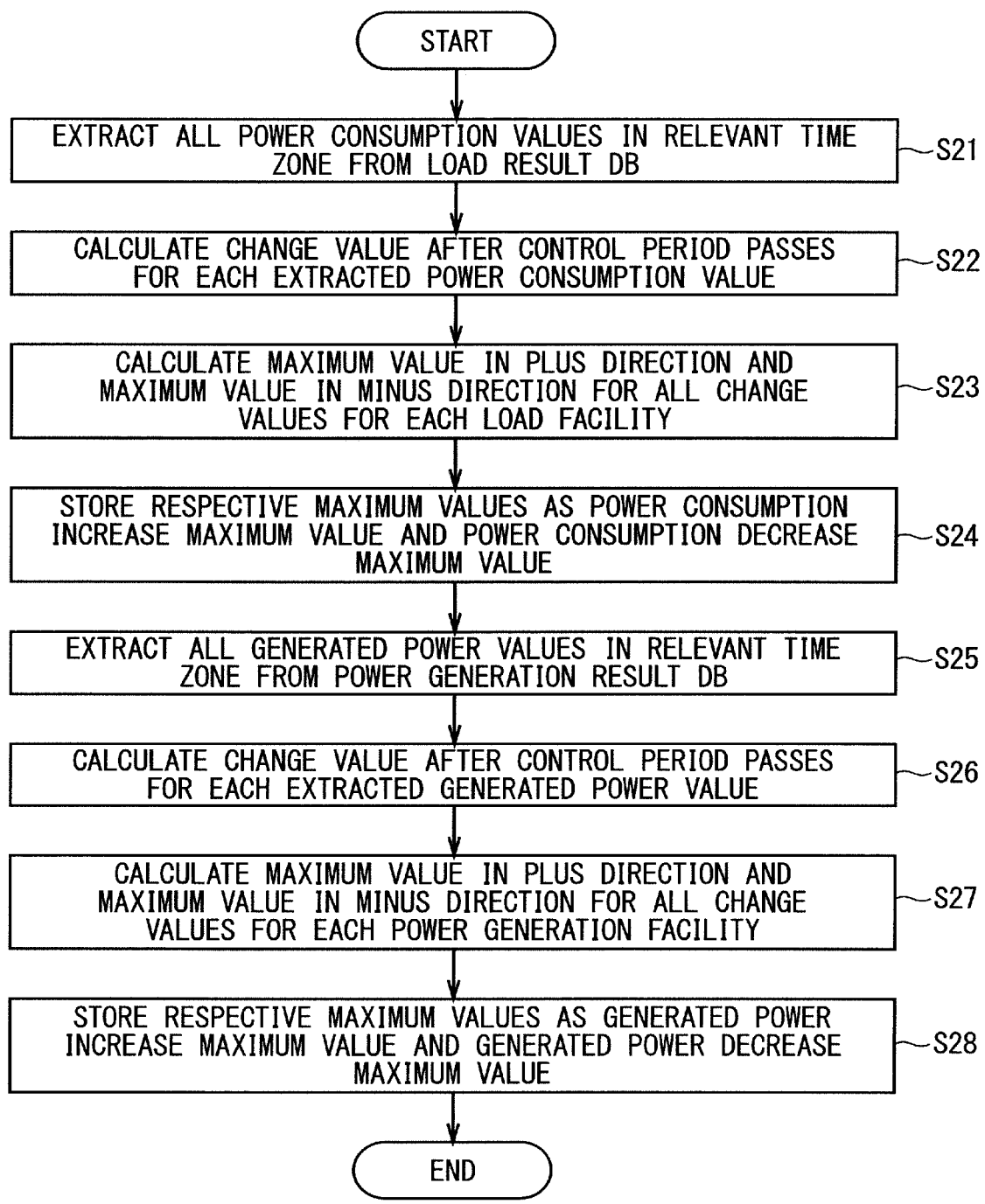
FIG. 5 is a flowchart showing an example of the operation of statistical processing in the central monitoring control device according to the first embodiment of the present invention.

FIG. 5 is a flowchart showing an example of the operation of statistical processing in the central monitoring control device 9. The statistical processing shown in FIG. 5 is performed in a period longer than the monitoring processing and control processing described below, for example, in a period of one hour.

In step S21, the load statistics analysis unit 14 extracts, from among the power consumption values in the predetermined period accumulated in the load result DB 13, all power consumption values in a time zone from the start time of the current fixed cycle to the start time of the next fixed cycle start (if started, for example, at 10:00, from 10:00 to 10:59 on all days in a predetermined period) are extracted.

In step S22, the load statistics analysis unit 14 calculates, for each of the extracted power consumption values, a deviation from a power consumption value after a control period (for example, 5 minutes) described below, that is, a change value of the power consumption value in the control period based on the following equation (1):

$$\text{Change value} = \text{power consumption value after control period} - \text{relevant power consumption value} \quad (1)$$

In step S23, the load statistics analysis unit 14 calculates the maximum value in the plus direction and the maximum value in the minus direction for all the change values of the power consumption value in the relevant time zone. Here, the maximum value of the change value in the plus direction refers to the maximum value of the change value of power consumption in the increasing direction and hereinafter, referred to as the power consumption increase maximum value. Also, the maximum value of the change value in the minus direction refers to the maximum value of the change value of power consumption in the decreasing direction and hereinafter, referred to as the power consumption decrease maximum value.

As for the power consumption increase maximum value and the power consumption decrease maximum value, the maximum values in the past accumulated in the load result DB 14 may be adopted as they are. When a noise-like element is contained in measured values of the power consumption value, for the purpose of eliminating the noise-like element, an expected value as an average value of the change value of power consumption and a standard deviation may be determined to set the values according to the following equations (2) and (3):

$$\text{power consumption increase maximum value} = \text{expected value} + 3 \times \text{standard deviation} \quad (2)$$

$$\text{power consumption decrease maximum value} = \text{expected value} - 3 \times \text{standard deviation} \quad (3)$$

In step S24, the load statistics analysis unit 14 stores the calculated power consumption increase maximum value and power consumption decrease maximum value in a memory area (not shown) of the central monitoring control device 9.

In step S25, the power generation statistics analysis unit 17 extracts, from among the generated power values in the predetermined period accumulated in the power generation result DB 16, all generated power values in a time zone from the start time of the current fixed cycle to the start time of the next fixed cycle.

In step S26, the power generation statistics analysis unit 17 calculates, for each of the extracted generated power values, a deviation from the generated power value after the elapse of a control period to be described below, that is, a change value of the generated power value in the control period. The method of calculating the change value of the generated power value is the same as the above formula (1).

In step S27, the power generation statistics analysis unit 17 calculates the maximum value in the plus direction and the maximum value in the minus direction for all change values of the generated power values in the relevant time zone. Here, the maximum value of the change value in the plus direction refers to the maximum value of the change value of the generated power in the increasing direction and hereinafter, referred to as the generated power increase maximum value. Also, the maximum value of the change value in the minus direction refers to the maximum value of the change value of the generated power in the decreasing direction and hereinafter, referred to as the generated power decrease maximum value. Incidentally, the generated power increase maximum value and the generated power decrease maximum value may be calculated by the same method as the above-described power consumption increase maximum value and power consumption decrease maximum value.

In step S28, the power generation statistics analysis unit 17 stores the calculated generated power increase maximum value and generated power decrease maximum value in a memory area (not shown) of the central monitoring control device 9.

FIG. 6 is a diagram showing an example of the generated power increase maximum value and the generated power decrease maximum value for each of the power generation facilities 5 stored in the memory area by the statistical processing of the power generation statistics analysis unit 17. In FIG. 6, the increase maximum value is the generated power increase maximum value and the decrease maximum value is the generated power decrease maximum value.

FIG. 6 shows a case where the power generation facility 5 is a photovoltaic power generation system. As shown in FIG. 6, in the night when solar power generation does not generate electric power, the generated power increase maximum value and the generated power decrease maximum value are zero. Also, in the daytime when electric power is generated, the generated power increase maximum value and the generated power decrease maximum value increase due to weather changes.

In the example of FIG. 6, the generated power increase maximum value and the generated power decrease maximum value are expressed as positive or negative signed numerical values. For example, in a certain time period when the generated power always changes only in the plus direction, the generated power does not decrease and so the generated power decrease maximum value becomes a positive value.

Also, in addition to the above-described time zones, the statistical processing may be performed by day of the week or by generated power value or by weather by acquiring weather information by measurement date/time from meteorological data (not shown). Here, "by generated power value" means, for example, a case where the generated power of each of the power generation facilities 5 is 0% to 10% of the rated value, 10% to 20%, and the like. "By weather" means, for example, a case of fine weather, a case of cloudy weather, and a case of rainy weather.

Figure 7:
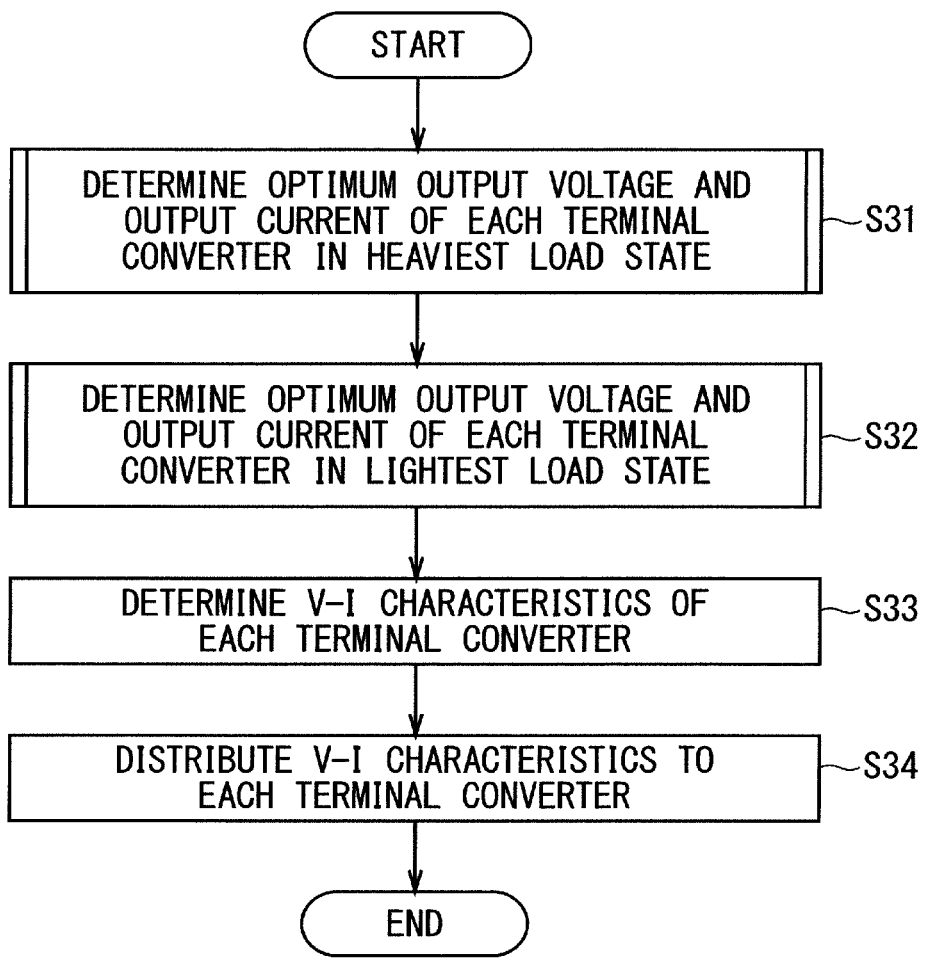
FIG. 7 is a flowchart showing an example of the operation of control processing in the central monitoring control device according to the first embodiment of the present invention.

FIG. 7 is a flowchart showing an example of the operation of control processing in the central monitoring control device 9. The control processing shown in FIG. 7 is performed in a cycle longer than the monitoring processing and longer than the processing time of the central monitoring control device 9 itself or the communication processing time between the central monitoring control device 9 and the terminal control device 10, for example, 5 minutes.

In step S31, the load state setting unit 18 assumes the heaviest load state that can occur up to the next control period based on the change of the power consumption in the past. Then, the converter optimum output determination unit 19 calculates the optimum output voltage (or the optimum interconnection point voltage) and output current of each terminal converter in the heaviest load state. Details of step S31 will be described below with reference to FIG. 8.

In step S32, the load state setting unit 18 assumes the lightest load state that can occur up to the next control period based on the change of the generated power in the past. Then, the converter optimum output determination unit 19 calculates the optimum output voltage (or the optimum interconnection point voltage) and output current of each terminal converter in the lightest load state. Details of step S32 will be described below with reference to FIG. 9.

In step S33, the V-I characteristic determination unit 21 determines the V-I characteristics of each terminal converter such that the system voltage falls within an appropriate range, no overcurrent arises, and the current/voltage distribution is optimal in the evaluation index even at both extremes of the heaviest load state and the lightest load state that can be assumed up to the next control period.

In step S34, the V-I characteristic distribution unit 22 distributes the V-I characteristics to each terminal converter.

Figure 8:
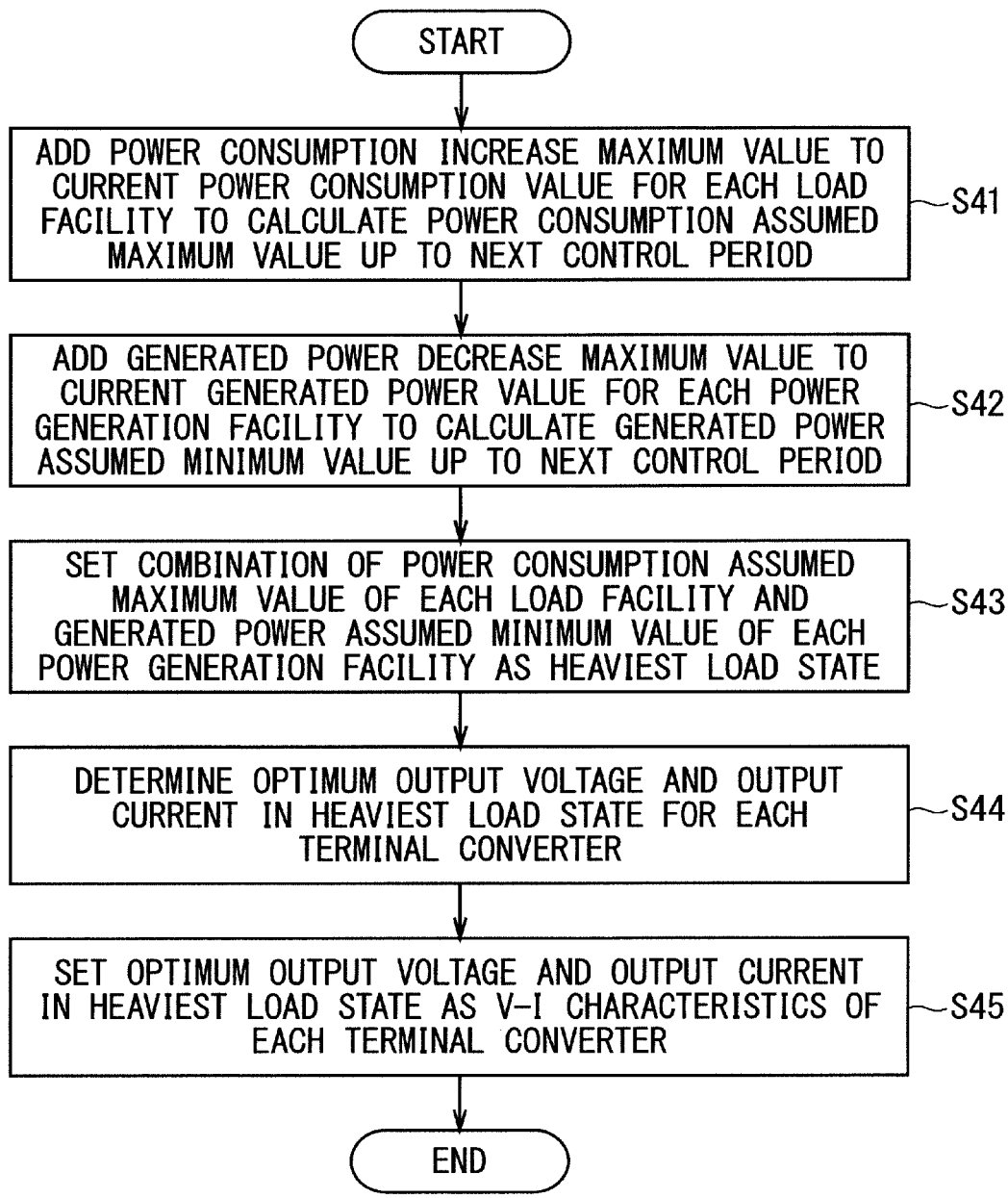
FIG. 8 is a flowchart showing an example of the operation of V-I characteristic determination processing in the heaviest load state in the central monitoring control device according to the first embodiment of the present invention.

FIG. 8 is a flowchart showing details of step S31 in FIG. 7.

In step S41, the load state setting unit 18 adds the power consumption increase maximum value calculated by the load statistics analysis unit 14 using statistical processing and stored in the memory area to the current power consumption value for each of the load facilities 4 to set the added value as the assumed maximum value of power consumption that can arise by the next control period (hereinafter, referred to as the power consumption assumed maximum value).

In step S42, the load state setting unit 18 adds the generated power decrease maximum value calculated by the power generation statistics analysis unit 17 and stored in the memory area to the current generated power value for each of the power generation facilities 5 and sets the added value as the assumed minimum value of generated power that can arise by the next control period (hereinafter, referred to as the generated power assumed minimum value).

In step S43, the load state setting unit 18 sets the combination of the power consumption assumed maximum value of each of the load facilities 4 and the generated power assumed minimum value of each of the power generation facilities 5 as the heaviest load state in the entire DC system.

In step S44, the converter optimum output determination unit 19 determines the optimum output voltage and output current in the heaviest load state for each terminal converter. More specifically, the converter optimum output determination unit 19 calculates the current/voltage distribution such that the system voltage falls within a proper range, an overcurrent does not arise in the DC cable 6, and the evaluation index is the highest by processing such as the load-flow calculation, the optimum calculation and the like. Accordingly, the output voltage and the output current of each terminal converter are determined.

In step S45, the V-I characteristic determination unit 21 sets the optimum output voltage and output current in the heavies load state determined by the converter optimum output determination unit 19 as the V-I characteristics of each terminal converter.

Figure 9:
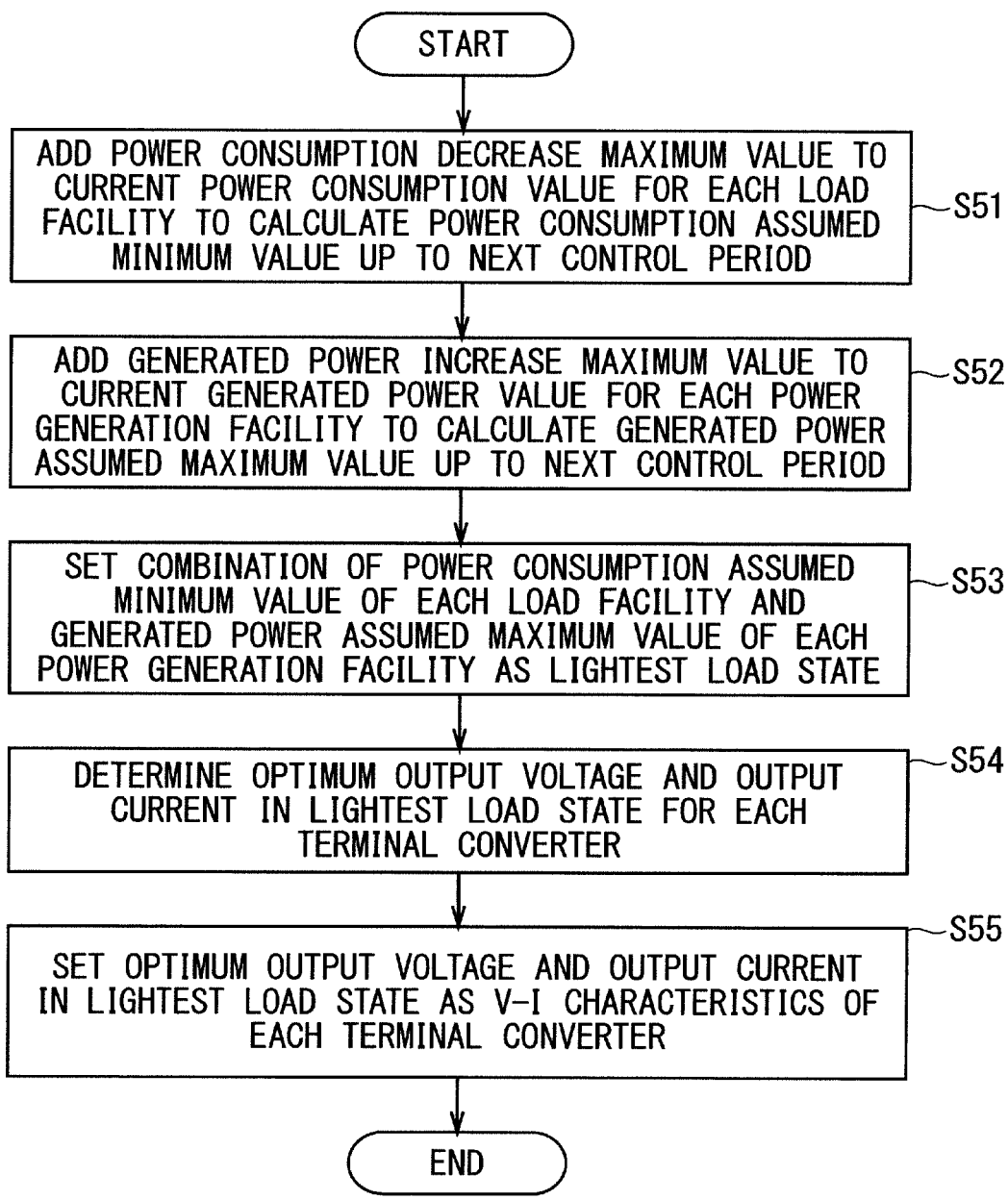
FIG. 9 is a flowchart showing an example of the operation of the V-I characteristic determination processing in the lightest load state in the central monitoring control device according to the first embodiment of the present invention.

FIG. 9 is a flowchart showing details of step S32 in FIG. 7.

In step S51, the load state setting unit 18 adds the power consumption decrease maximum value calculated by the load statistics analysis unit 14 using statistical processing and stored in the memory area to the current power consumption value for each of the load facilities 4 to set the added value as the assumed minimum value of power consumption that can arise by the next control period (hereinafter, referred to as the power consumption assumed minimum value).

In step S52, the load state setting unit 18 adds the generated power increase maximum value calculated by the power generation statistics analysis unit 17 and stored in the memory area to the current generated power value for each of the power generation facilities 5 to set the added value as the assumed maximum value of generated power that can arise by the next control period (hereinafter, referred to as the generated power assumed maximum value).

In step S53, the load state setting unit 18 sets the combination of the power consumption assumed minimum value of each of the load facilities 4 and the generated power assumed maximum value of each of the power generation facilities 5 as the lightest load state in the entire DC system.

In step S54, the converter optimum output determination unit 19 determines the optimum output voltage and output current in the lightest load state for each terminal converter. More specifically, the converter optimum output determination unit 19 calculates the current/voltage distribution such that the system voltage falls within a proper range, an overcurrent does not arise in the DC cable 6, and the evaluation index is the highest by processing such as the load-flow calculation, the optimum calculation and the like. Accordingly, the output voltage and the output current of each terminal converter are determined.

In step S55, the V-I characteristic determination unit 21 sets the optimum output voltage and output current in the lightest load state determined by the converter optimum output determination unit 19 as the V-I characteristic of each terminal converter.

From FIGS. 8 and 9, the load state setting unit 18 has a function as a prediction unit that predicts the change range of power consumption in a predetermined period based on the current power consumption and the power consumption accumulated in the load result DB 13 and also predicts the change range of generated power in a predetermined period based on the current generated power and the generated power accumulated in the power generation result DB 16.

Figure 10:
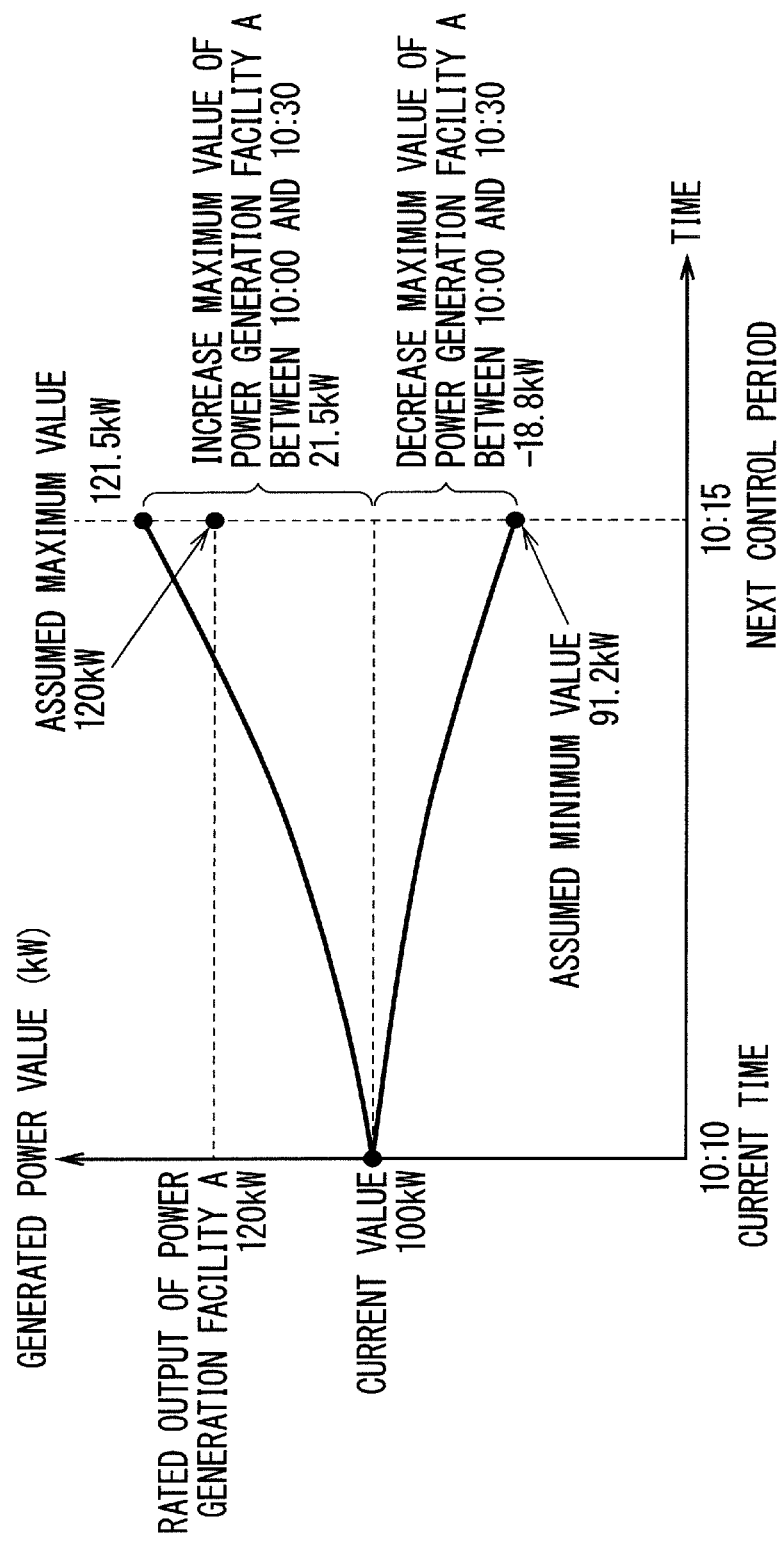
FIG. 10 is a diagram showing an example of prediction of an assumed maximum value and an assumed minimum value of generated power according to the first embodiment of the present invention.

FIG. 10 is a diagram showing an example of prediction of the generated power assumed maximum value and the generated power assumed minimum value and is an image diagram that sets the generated power assumed maximum value and the generated power assumed minimum value that can be assumed up to the next control period based on the generated power increase maximum value and the generated power decrease maximum value determined by statistical processing for a power generation facility A illustrated in FIG. 9 and the current generated power value.

In FIG. 10, the assumed maximum value is the generated power assumed maximum value, the assumed minimum value is the generated power assumed minimum value, the increase maximum value is the generated power increase maximum value, and the decrease maximum value is the generated power decrease maximum value.

Basically, the value obtained by adding the generated power increase maximum value to the current generated power value becomes the generated power assumed maximum value, and the value obtained by adding the generated power decrease maximum value to the current generated power value becomes the generated power assumed minimum value. However, the generated power generated by the power generation facility 5 is limited within the range of 0% to 100% of the rated power and thus, determinations are made based on the following equations (4) and (5).

Generated power assumed maximum value of power generation facility $A$=min(max(current value+increase maximum value,0),rated power of power generation facility $A$) (4)

Generated power assumed minimum value of power generating facility $A$=min (max(current value−decrease maximum value,0),rated power of power generation facility $A$) (5)

Here, max ( ) is an operator that adopts the larger numerical value in ( ), and min ( ) is an operator that adopts the smaller numerical value in ( ). Also, in the equations (4) and (5), the current value indicates the current generated power value, the increase maximum value indicates the generated power increase maximum value, and the decrease maximum value indicates the generated power decrease maximum value.

In the example of FIG. 10, the generated power value in the control processing at 10:10 is 100 kW, and the generated power increase maximum value up to 10:15 as the next control period is +21.5 kW when the time zone from 10:00 to 11:00 in FIG. 6 is viewed. Therefore, the generated power assumed maximum value is 100 kW+21.5 kW=121.5 kW. However, the rated output of the power generation facility A is 120 kW and thus, the generated power assumed maximum value of the power generation facility A is 120 kW.

Figure 11:
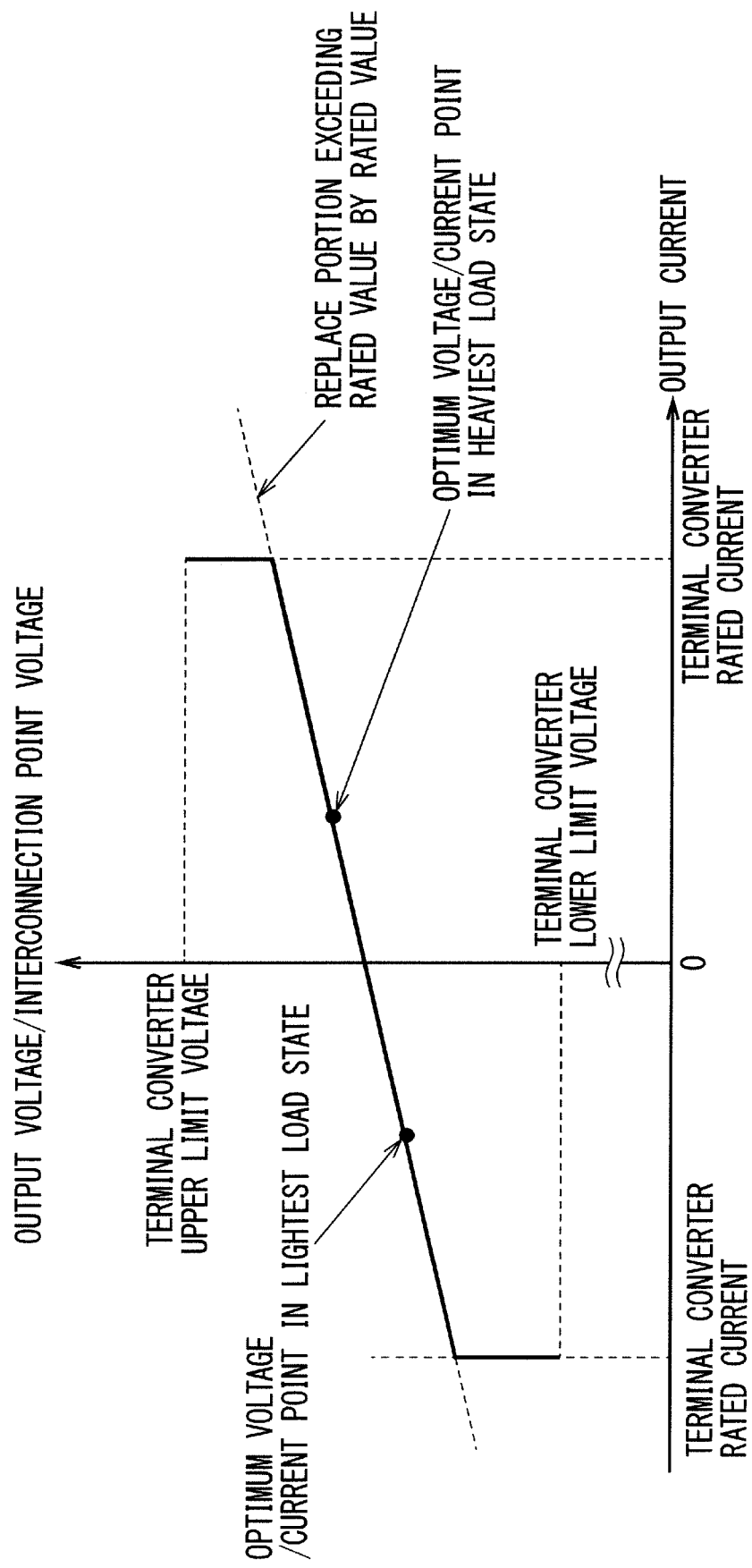
FIG. 11 is a diagram showing an example of V-I characteristics according to the first embodiment of the present invention.

FIG. 11 is a diagram showing an example of V-I characteristics determined by the V-I characteristic determination unit 21.

As shown in FIG. 11, the V-I characteristic determination unit 21 plots the optimum output voltage and output current of the terminal converter in each of the heaviest load state and the lightest load state obtained in FIGS. 8 and 9 as V-I characteristics. Then, a straight line connecting the two points is drawn so as to fit inside the range from the rated current in the plus direction to the rated current in the minus direction and is also drawn so as to fit inside the range from the upper limit voltage of the terminal converter to the lower limit voltage. In addition, the portions exceeding the rated current and the rated voltage are replaced by four lines of the rated current in the plus direction, the rated current in the minus direction, the upper limit voltage of the terminal converter, and the lower limit voltage of the terminal converter. The straight lines drawn in this way are determined as a new V-I characteristic of the terminal converter.

When performing constant voltage control, each of the terminal control devices 10 and 11 determines an output voltage command value matching the output current of the terminal converter to be controlled in accordance with V-I characteristics distributed from the V-I characteristic distribution unit 22 and issues the output voltage command value to the terminal converter. When performing constant current control, each of the terminal control devices 10 and 11 determines an output current command value matching the interconnection point voltage of the terminal converter to be controlled in accordance with V-I characteristics distributed from the V-I characteristic distribution unit 22 and issues the output current command value to the terminal converter.

From the above, according to the first embodiment, even when the control period is long and at least one of the power consumption of the load facility and the power generated by the power generation facility changes during the control period, the control following the change can be performed. In addition, even when the maximum possible change in both extremes occurs, a state of the optimum DC system can be guaranteed with a predetermined evaluation index such as minimizing power loss. In this way, a balance between demand and supply of power in the DC system can always be maintained.

Second Embodiment

A second embodiment is characterized by, in addition to the two states of the heaviest load state and the lightest load state described in the first embodiment, determining V-I characteristics based on three states including the probabilistically most likely expected value state. The configuration of the current/voltage control apparatus 1 according to the second embodiment and its surroundings are the same as those of the first embodiment and so a detailed description thereof is omitted here. Differences from the first embodiment will mainly be described below.

<Configuration>

The load statistics analysis unit 14 statistically analyzes the power consumption values in a predetermined period of the past accumulated in the load result DB 13 to calculate the power consumption increase maximum value, the power consumption decrease maximum value, and a power consumption increase/decrease expected value indicating how much the power consumption changes on average in a predetermined control period for each of the load facilities 4.

The power generation statistics analysis unit 17 statistically analyzes the generated power values in a predetermined period of the past accumulated in the power generation result DB 16 to calculate a generated power increase/ decrease expected value indicating how much the generated power increase maximum value, the generated power decrease maximum value, and the generated power change on average in a predetermined control period for each of the power generation facilities 5.

The load state setting unit 18 calculates a power consumption assumed maximum value, a power consumption assumed minimum value, and a power consumption assumed expected value of each of the load facilities 4 that can be assumed up to the next control period based on the current power consumption value of each of the load facilities 4 received by the load measurement receiving unit 12 and the power consumption increase maximum value, the power consumption decrease maximum value, and the power consumption increase/decrease expected value of the power consumption of each of the load facilities 4 calculated by the load statistics analysis unit 14. Similarly, the load state setting unit 18 calculates a generated power assumed maximum value, a generated power assumed minimum value, and a generated power assumed expected value of each of the power generation facilities 5 that can be assumed up to the next control period based on the current generated power value of each of the power generation facilities 5 received by the power generation measurement receiving unit 15 and the generated power increase maximum value, the generated power decrease maximum value, and the generated power increase/decrease expected value of the power consumption of each of the power generation facilities 5 calculated by the power generation statistics analysis unit 17.

Further, in addition to the heavy load state and the light load state, the load state setting unit 18 sets a combination of the power consumption value and the generated power value at which the power consumption of each of the load facilities 4 becomes the expected value and the generated power of each of the power generation facilities 5 becomes the expected value respectively as an expected value load state.

The converter optimum output determination unit 19 determines the optimum output current value and output voltage value (or the optimum interconnection point voltage) of each terminal converter that satisfy two constraint conditions and whose evaluation calculated based on the predetermined evaluation index related to electric quantities such as the current, voltage, and power becomes the highest by calculation that makes a search from among all combinations of the output current value and the output voltage value (or the interconnection point voltage) that can be operated by each terminal converter by brute force or by an optimal computation means such as the linear programming method, quadratic programming method, or genetic algorithm to shorten the calculation time. Here, the two constraint conditions are conditions that each system voltage at interconnection points of the terminal converter, the load facility 4, and the power generation facility 5 in the DC system falls within a predetermined allowable range of voltage and each current passing through all points of the DC cable 6 falls within a predetermined allowable range of current for each of the heavy load state, the light load state, and the expected value load state set by the load state setting unit 18. Note that "within an allowable range of voltage" means that the voltage is within the predetermined upper limit and lower limit of the voltage.

The V-I characteristic determination unit 21 sets a line connecting three points of the optimum output current value and the optimum output voltage value in the heavy load state, the light load state, and the expected value load state of each terminal converter as the V-I characteristics.

<Operation>

The operation of monitoring processing in the central monitoring control device 9 is the same as that in the first embodiment and thus, the description thereof is omitted here.

Figure 12:
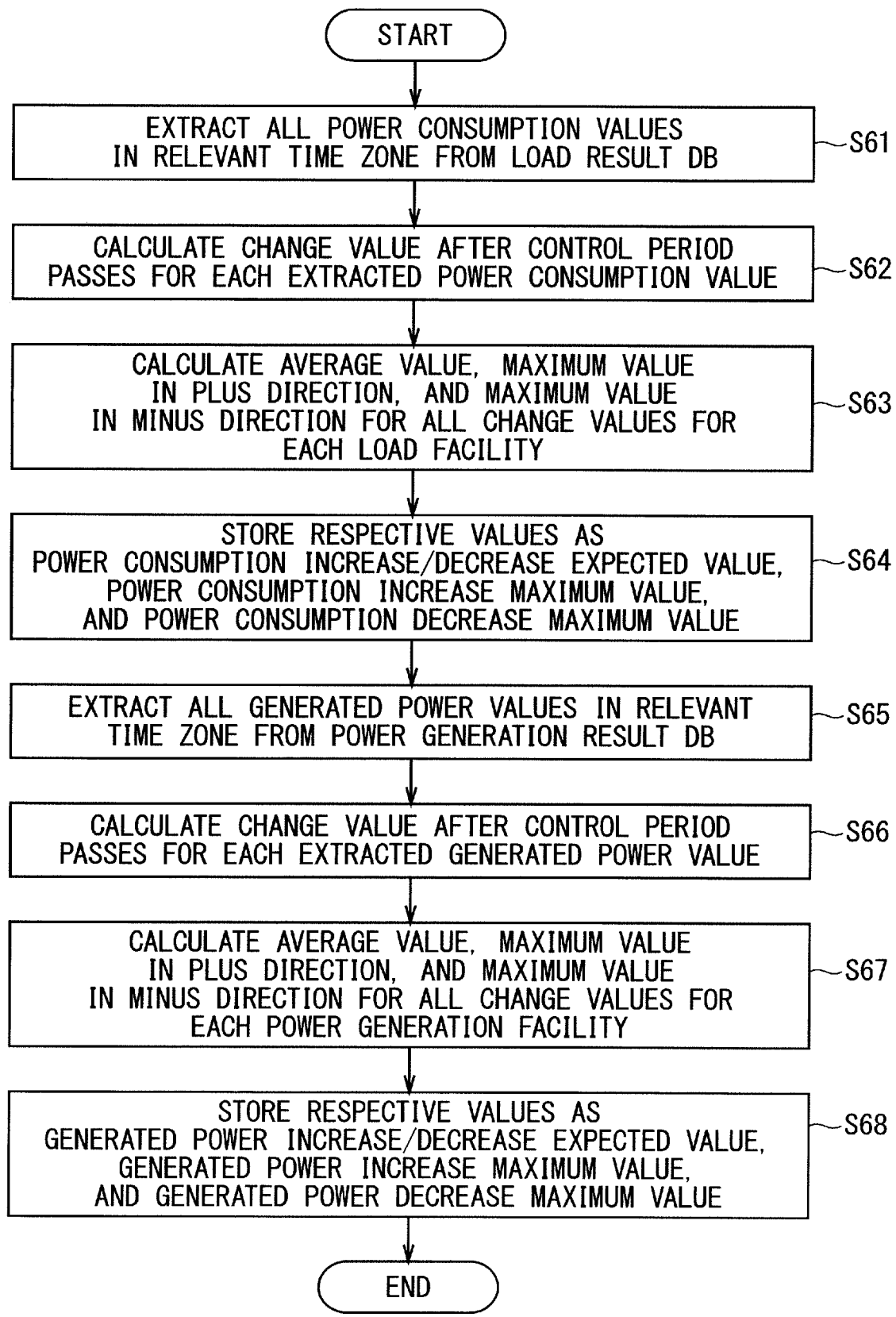
FIG. 12 is a flowchart showing an example of the operation of statistical processing in the central monitoring control device according to a second embodiment of the present invention.

FIG. 12 is a flowchart showing an example of the operation of statistical processing in the central monitoring control device 9. The statistical processing shown in FIG. 12 is performed in a period longer than the monitoring processing and control processing described below, for example, in a period of one hour. Step S61, step S62, step S65, and step S66 in FIG. 12 are the same as step S21, step S22, step S25, and step S26 in FIG. 5 respectively and thus, the description thereof is omitted here.

In step S63, the load statistics analysis unit 14 calculates the power consumption increase maximum value, the power consumption decrease maximum value, and the power consumption increase/decrease expected value for all change values of power consumption in the relevant time zone.

In step S64, the load statistics analysis unit 14 stores the calculated power consumption increase maximum value, power consumption decrease maximum value, and power consumption increase/decrease expected value in a memory area (not shown) of the central monitoring control device 9.

In step S67, the power generation statistics analysis unit 17 calculates the generated power increase maximum value, the generated power decrease maximum value, and the generated power increase/decrease expected value for all change values of generated power values in the relevant time zone.

In step S68, the power generation statistics analysis unit 17 stores the calculated generated power increase maximum value, generated power decrease maximum value, and generated power increase/decrease expected value in a memory area (not shown) of the central monitoring control device 9.

FIG. 13 is a diagram showing an example of the generated power increase/decrease expected value, the generated power increase maximum value, and the generated power decrease maximum value for each of the power generation facilities 5 stored in the memory area by the statistical processing of the power generation statistics analysis unit 17. In FIG. 13, the increase/decrease expected value is the generated power increase/decrease expected value, the increase maximum value is the generated power increase maximum value, and the decrease maximum value is the generated power decrease maximum value.

Like in the first embodiment, in addition to the above-described time zones, the statistical processing may be performed by day of the week or by generated power value or by weather by acquiring weather information by measurement date/time from meteorological data (not shown).

Figure 14:
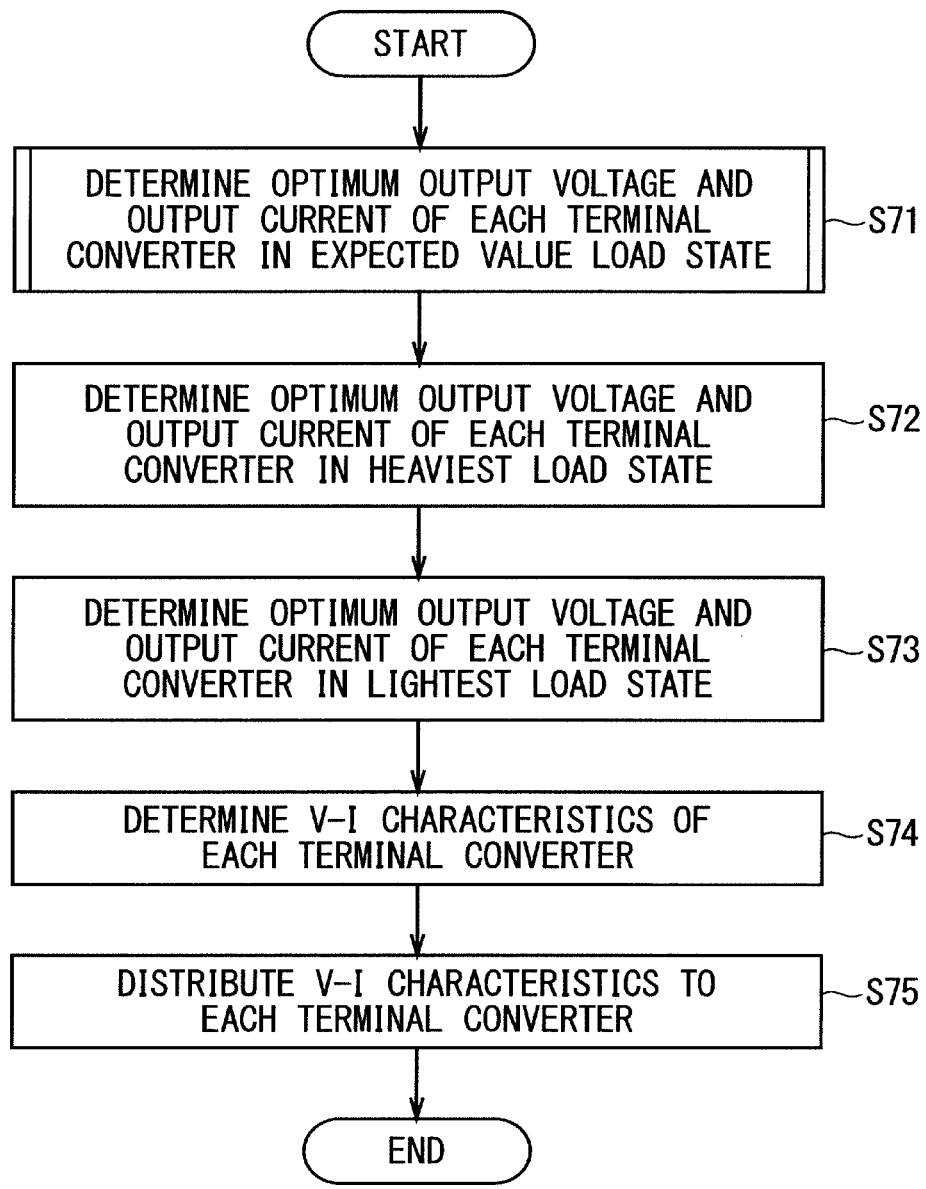
FIG. 14 is a flowchart showing an example of the operation of control processing in the central monitoring control device according to the second embodiment of the present invention.

FIG. 14 is a flowchart showing an example of the operation of control processing in the central monitoring control device 9. The control processing shown in FIG. 14 is performed in a cycle longer than the monitoring processing and longer than the processing time of the central monitoring control device 9 itself or the communication processing time between the central monitoring control device 9 and the terminal control device 10, for example, 5 minutes. Step S72 and step S73 of FIG. 14 are the same as step S31 and step S32 of FIG. 7 and thus, the description thereof is omitted here.

In step S71, the load state setting unit 18 assumes the expected value load state that probabilistically most likely to occur up to the next control period based on the change of the power consumption in the past. Then, the converter optimum output determination unit 19 calculates the optimum output voltage (or the optimum interconnection point voltage) and output current of each terminal converter in the expected value load state. Details of step S71 will be described below using FIG. 15.

In step S74, the V-I characteristic determination unit 21 determines the V-I characteristics of each terminal converter such that the system voltage falls within an appropriate range, no overcurrent arises, and the current/voltage distribution is optimal in the evaluation index even in the heaviest load state, the lightest load state, and the expected value load state that can be assumed up to the next control period.

In step S75, the V-I characteristic distribution unit 22 distributes the V-I characteristics to each terminal converter.

Figure 15:
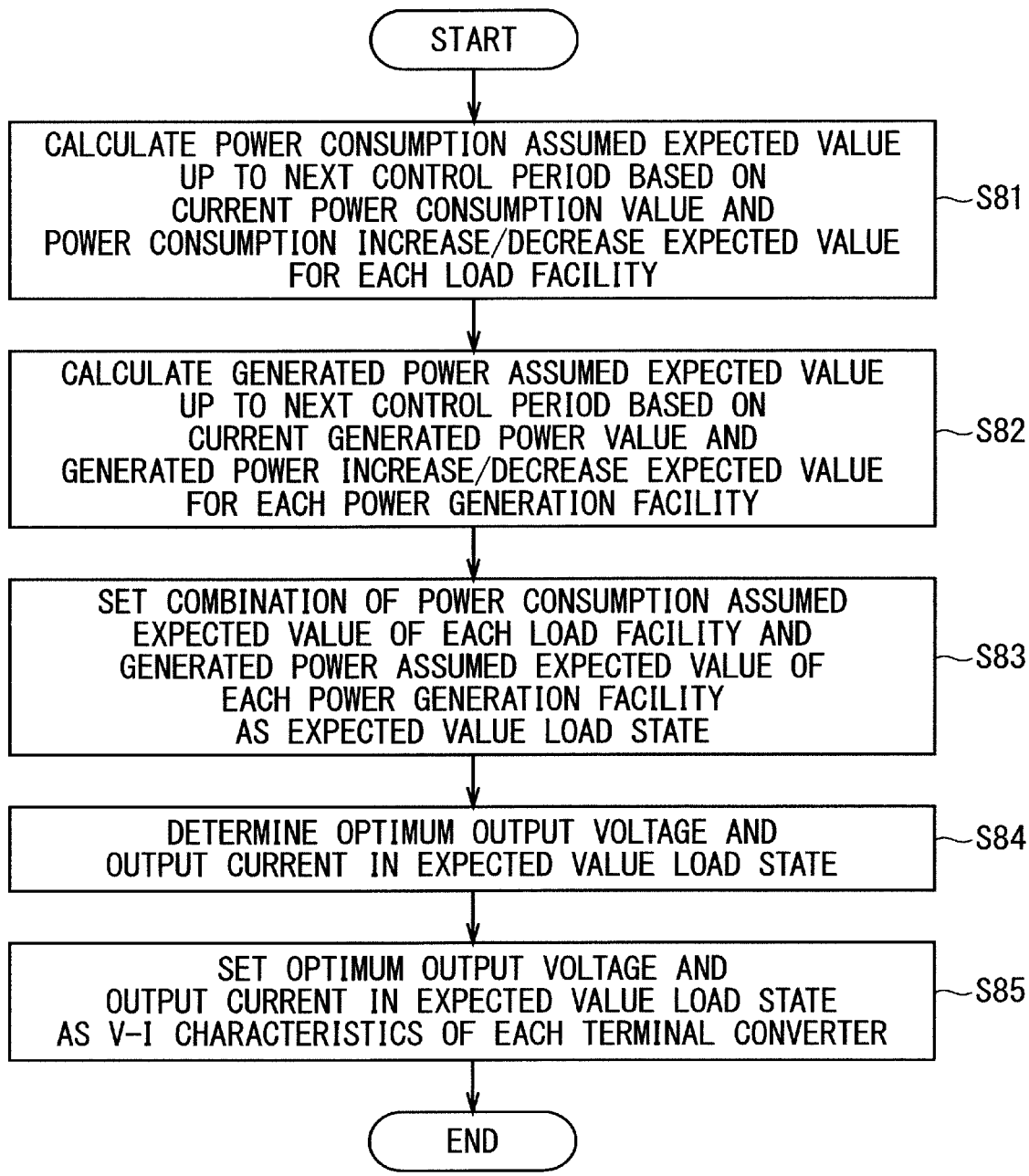
FIG. 15 is a flowchart showing an example of V-I characteristic determination processing in an expected value load state in the central monitoring control device according to the second embodiment of the present invention.

FIG. 15 is a flowchart showing details of step S71 in FIG. 14.

In step S81, the load state setting unit 18 adds 50% of the power consumption increase/decrease expected value calculated by the load statistics analysis unit 14 using statistical processing and stored in the memory area to the current power consumption value for each of the load facilities 4 to set the added value as the power consumption assumed expected value up to the next control period.

In step S82, the load state setting unit 18 adds 50% of the generated power increase/decrease expected value calculated by the power generation statistics analysis unit 17 and stored in the memory area to the current generated power value for each of the power generation facilities 5 and sets the value calculated according to the formula (6) below so as to fall within the rated range of the power generation facility 5 as the generated power assumed expected value up to the next control period.

Assumed expected value of power generation facility=min(max(current value+increase/decrease expected value×50%,0),rated power of power generation facility)   (6)

Here, max ( ) is an operator that adopts the larger numerical value in ( ), and min ( ) is an operator that adopts the smaller numerical value in ( ). Also, in the formula (6), the assumed expected value indicates the generated power assumed expected value, the current value indicates the current generated power value, and the increase/decrease expected value indicates the generated power increase/decrease expected value. By multiplying the generated power increase/decrease expected value by 50% as shown in the formula (6), the generated power expected value becomes an intermediate value between the generated power value at the present point in time and the generated power expected value at the start point of the next control period.

In step S83, a combination of the power consumption assumed expected value of each of the load facilities 4 and the generated power assumed expected value of each of the power generation facilities 5 is set as the expected value load state in the entire DC system.

In step S84, the converter optimum output determination unit 19 determines the optimum output voltage and output current in the expected value load state for each terminal converter. More specifically, the converter optimum output determination unit 19 calculates the current/voltage distribution such that the system voltage falls within a proper range, an overcurrent does not arise in the DC cable 6, and the evaluation index is the highest by processing such as the load-flow calculation, the optimum calculation and the like. Accordingly, the output voltage and the output current of each terminal converter are determined.

In step S85, the V-I characteristic determination unit 21 sets the optimum output voltage and output current in the expected value load state determined by the converter optimum output determination unit 19 as the V-I characteristics of each terminal converter.

Figure 16:
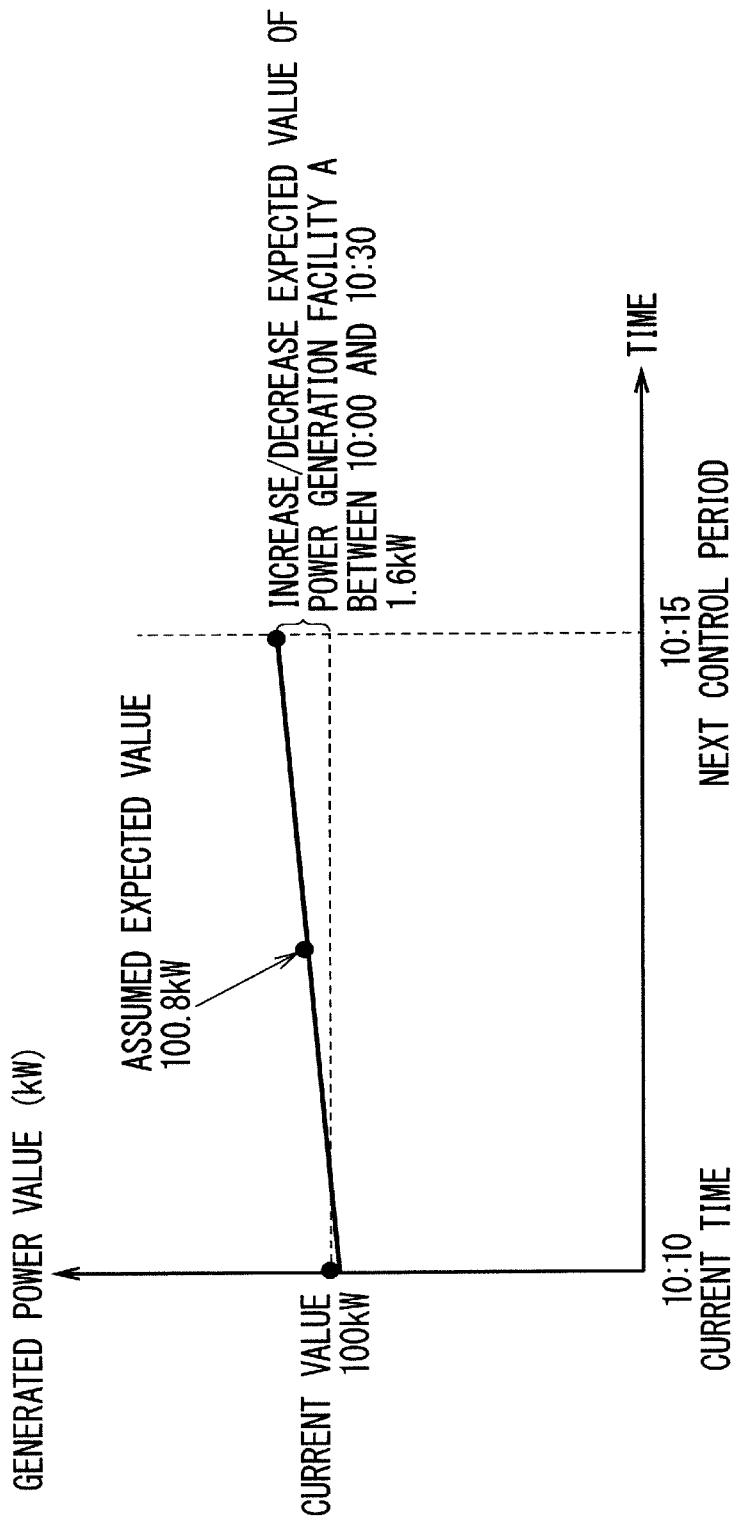
FIG. 16 is a diagram showing an example of prediction of an assumed expected value of generated power according to the second embodiment of the present invention.

FIG. 16 is a diagram showing an example of prediction of the generated power assumed expected value and is an image diagram that sets the generated power assumed expected value that can be assumed up to the next control period based on the generated power increase/decrease expected value determined by statistical processing for the power generation facility A illustrated in FIG. 13 and the current generated power value.

In FIG. 16, the assumed expected value is the generated power assumed expected value and the increase/decrease expected value is the generated power increase/decrease expected value.

In the example of FIG. 16, the generated power value in the control processing at 10:10 is 100 kW and the generated power increase/decrease expected value up to 10:15 as the next control period is +1.6 kW when the time zone from 10:00 to 11:00 in FIG. 13 is viewed. Therefore, the generated power assumed expected value is 100 kW+1.6 kW×0.5=100.8 kW.

Figure 17:
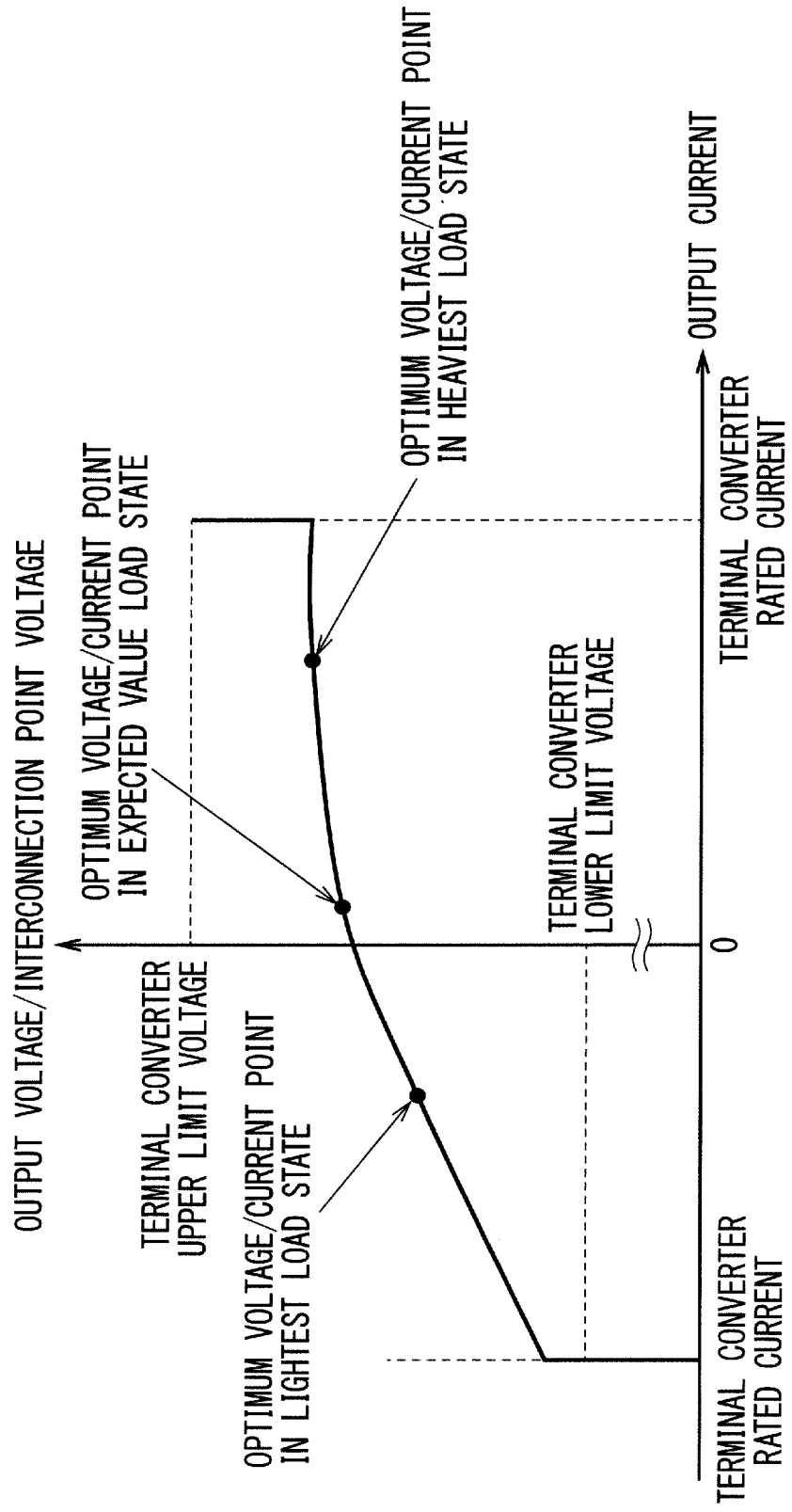
FIG. 17 is a diagram showing an example of the V-I characteristics according to the second embodiment of the present invention.

FIG. 17 is a diagram showing an example of V-I characteristics determined by the V-I characteristic determination unit 21.

As shown in FIG. 17, the V-I characteristic determination unit 21 plots three points of the optimum output voltage and output current of the terminal converter in each of the heaviest load state, the lightest load state, and the expected value load state obtained in FIG. 15 as V-I characteristics. Then, an approximate curve connecting the three points is drawn so as to fit inside the range from the rated current in the plus direction to the rated current in the minus direction and is also drawn so as to fit inside the range from the upper limit voltage of the terminal converter to the lower limit voltage. In addition, the portions exceeding the rated current and the rated voltage are replaced by four lines of the rated current in the plus direction, the rated current in the minus direction, the upper limit voltage of the terminal converter, and the lower limit voltage of the terminal converter. The straight lines drawn in this way are determined as a new V-I characteristic of the terminal converter.

From the above, according to the second embodiment, in addition to the heaviest load state and the lightest load state, even in the probabilistically most likely expected value load state, a state of the optimum DC system can be guaranteed with a predetermined evaluation index such as minimizing power loss. Therefore, control close to optimum can be performed in more states than in the first embodiment so that a balance between demand and supply of power can always be maintained in the DC system.

It should be noted that in the present invention, each embodiment can freely be combined or each embodiment can be modified or omitted as appropriate within the scope of the invention.

Though the present invention has been described in detail, the above description is illustrative in all aspects, and the present invention is not limited thereto. It is understood that innumerable modifications not illustrated can be envisaged without departing from the scope of the present invention.

EXPLANATION OF REFERENCE SIGNS

1: current/voltage control apparatus
2: AC/DC converter

3: DC/DC converter
4: load facility
5: power generation facility
6: DC cable
7: load measuring device
8: power generation measuring device
9: central monitoring control device
10, 11: terminal control device
12: load measurement receiving unit
13: load result DB
14: load statistics analysis unit
15: power generation measurement receiving unit
16: power generation result DB
17: power generation statistics analysis unit
18: load state setting unit
19: converter optimum output determination unit
20: system facility DB
21: V-I characteristic determination unit
22: V-I characteristic distribution unit

The invention claimed is:

1. A current and voltage control apparatus that controls an output current and an output voltage of at least one terminal converter in a direct current (DC) system including:
the at least one terminal converter, which is interconnected to a terminal of a DC cable,
at least one load facility interconnected to the DC cable, and
at least one power generation facility interconnected to the DC cable, the current and voltage co apparatus comprising:
a central monitoring control device that controls voltage-current (V-I) characteristics of the terminal converter based on power consumption consumed by the at least one load facility and generated power generated by the at least one power generation facility, wherein
the central monitoring control device includes:
a load result data base that accumulates the power consumption and the at least one the load facility in association with each other,
a power generation result database that accumulates the generated power and the at least one power generation facility in association with each other,
a predictor that predicts a change range of power consumption in a predetermined period based on the power consumption at a current time and the power consumption accumulated in the load result database and also predicts a change range of generated power in the predetermined period based on the generated power at the current time and the generated power accumulated in the power generation result database, and
a V-I characteristic determinator that determines the V-I characteristics of the terminal converter based on the change range of the power consumption and the change range of the generated power predicted by the predictor wherein
the predictor predicts a power consumption assumed maximum value as a maximum value of the power consumption assumed in the predetermined period and a power consumption assumed minimum value as a minimum value of the power consumption assumed in the predetermined period based on the power consumption at the current time and the power consumption accumulated in the load result database,
the predictor predicts a generated power assumed maximum value as the maximum value of the generated power assumed in the predetermined period and a generated power assumed minimum value as the minimum value of the generated power assumed in the predetermined period based on the generated power at the current time and the generated power accumulated in the power generation result database,
the predictor predicts a range between a heaviest load state as a state in which the power consumption assumed maximum value and the generated power assumed minimum value are combined in the DC system and a lightest load state as a state in which the power consumption assumed minimum value and the generated power assumed maximum value are combined in the DC system as a change range of the power consumption and as a change range of the generated power,
the V-I characteristic determinator calculates a current and voltage distribution in the DC system based on a predetermined evaluation index for each of the heaviest load state and the lightest load state, and
the V-I characteristic determinator determines a line connecting points including an output current value and an output voltage value of the terminal converter in each of the heaviest load state and the lightest load state calculated based on the current and voltage distribution as the V-I characteristics.

2. The current and voltage control apparatus according to claim 1, further comprising:
a terminal control device that controls the terminal converter under direction of the central monitoring control device, wherein
the terminal control device determines the output voltage of the terminal converter based on the V-I Characteristics determined by the V-I characteristic determinator and the output current of the terminal converter when the terminal converter is subjected to constant voltage control, and
the terminal control device determines the output current of the terminal converter based on the V-I characteristics determined by the V-I characteristic determinator and an interconnection point voltage of the terminal converter when the terminal converter is subjected to constant current control.

3. The current and voltage control apparatus according to claim 1, wherein
the V-I characteristic determinator further determines the V-I characteristics of the terminal converter based on predetermined constraint conditions including conditions in which all voltages in the DC system fall within a predetermined voltage allowable range and in which a current flowing through the DC system falls within a predetermined current allowable range.

4. The current and voltage control apparatus according to claim 1, wherein the evaluation index is that a power loss in the DC system is minimum or a system voltage in the DC system is in a middle of a predetermined voltage allowable range.

5. A current and voltage control apparatus that controls an output current and an output voltage of at least one terminal converter in a direct current (DC) system including:
the at least one terminal converter, which is interconnected to a terminal of a DC cable,
at least one load facility interconnected to the DC cable, and
at least one power generation facility interconnected to the DC cable, the current and voltage control apparatus comprising:
a central monitoring control device that controls voltage-current (V-I) characteristics of the terminal converter based on power consumption consumed by the at least one load facility and generated power generated by the at least one power generation facility, wherein
the central monitoring control device includes:
a load result data base that accumulates the power consumption and the at least one the load facility in association with each other,
a power generation result database that accumulates the generated power and the at least one power generation facility in association with each other,
a predictor that predicts a change range of power consumption in a predetermined period based on the power consumption at a current time and the power consumption accumulated in the load result database and also predicts a change range of generated power in the predetermined period based on the generated power at the current time and the generated power accumulated in the power generation result database, and
a V-I characteristic determinator that determines the characteristics of the terminal converter based on the change range of the power consumption and the change range of the generated power predicted by the predictor, wherein
the predictor predicts a power consumption assumed maximum value as a maximum value of the power consumption assumed in the predetermined period and a power consumption assumed minimum value as a minimum value of the power consumption assumed in the predetermined period based on the power consumption at the current time and the power consumption accumulated in the load result database,
the predictor predicts a generated power assumed maximum value as the maximum value of the generated power assumed in the predetermined period and a generated power assumed minimum value as the minimum value of the generated power assumed in the predetermined period based on the generated power at the current time and the generated power accumulated in the power generation result database,
the predictor predicts a range between a heaviest load state as a state in which the power consumption assumed maximum value and the generated power assumed minimum value are combined in the DC system and a lightest load state as a state in which the power consumption assumed minimum value and the generated power assumed maximum value are combined in the DC system as a change range of the power consumption and as a change range of the generated power, and
the predictor predicts a power consumption assumed expected value as an average value of Change of the power consumption assumed in the predetermined period based on the power consumption at the current time and the power consumption accumulated in the load result database and also predicts a generated power assumed expected value as an average value of change of the generated power assumed in the predetermined period based on the generated power at the current time and the generated power accumulated in the power generation result database to set a combination of the power consumption assumed expected value and the generated power assumed expected value as an expected value load state.

6. The current and voltage control apparatus according to claim 5, further comprising:
a terminal control device that controls the terminal converter under direction of the central monitoring control device, wherein
the terminal control device determines the output voltage of the terminal converter based on the V-I characteristics determined by the V-I characteristic determinator and the output current of the terminal converter when the terminal converter is subjected to constant voltage control, and
the terminal control device determines the output current of the terminal converter based on the V-I characteristics determined by the V-I characteristic determinator and an interconnection point voltage of the terminal converter when the terminal converter is subjected to constant current control.

7. The current and voltage control apparatus according to claim 5, wherein
the V-I characteristic determinator further determines the V-I characteristics of the terminal converter based on predetermined constraint conditions including conditions in which all voltages in the DC system fall within a predetermined voltage allowable range and in which a current flowing through the DC system falls within a predetermined current allowable range.

8. The current and voltage control apparatus according to claim 5, wherein
the V-I characteristic determinator calculates a current and voltage distribution in the DC system based on a predetermined evaluation index for each of the heaviest load state, the lightest load state, and the expected value load state, and
the V-I characteristic determinator determines a line connecting points including an output current value and an output voltage value of the terminal converter in each of the heaviest load state, the lightest load state, and the expected value load state calculated based on the current and voltage distribution as the V-I characteristics.

9. The current and voltage control apparatus according to claim 8, wherein the evaluation index is that a power loss in the DC system is minimum or a system voltage in the DC system is in a middle of a predetermined voltage allowable range.

* * * * *